Oct. 11, 1960  J. B. HILDERBRAND  2,955,719
APPARATUS FOR CUTTING FIBROUS MATERIAL
Filed June 6, 1958  2 Sheets-Sheet 1

INVENTOR.
JAMES B. HILDERBRAND
BY Andrus & Starke
ATTORNEYS

Oct. 11, 1960 J. B. HILDERBRAND 2,955,719
APPARATUS FOR CUTTING FIBROUS MATERIAL
Filed June 6, 1958 2 Sheets-Sheet 2

INVENTOR.
JAMES B. HILDERBRAND
BY
ATTORNEYS

United States Patent Office 2,955,719
Patented Oct. 11, 1960

2,955,719

APPARATUS FOR CUTTING FIBROUS MATERIAL

James B. Hilderbrand, Kankakee, Ill., assignor to A. O. Smith Corporation, Milwaukee, Wis., a corporation of New York Filed June 6, 1958, Ser. No. 740,315

10 Claims. (Cl. 214—17)

This invention relates to an apparatus for dislodging fibrous material and more particularly to a cutter tooth structure employed to cut fibrous material, such as silage, which is contained in a storage vessel.

Fibrous food material, such as silage or haylage, is frequently stored in air tight vessels or silos to prevent spoilage of the material. As the vessel is sealed to the atmosphere, the silage is usually removed by a bottom unloader which undercuts the silage and conveys the cut silage to the exterior of the silo. In an unloader mechanism such as this, a rotating cutter arm is mounted at the center of the silo and carries an endless chain which travels about the rotating cutter arm. A plurality of teeth are secured to the endless chain and serve to cut the silage and convey the cut silage to the center of the silo. A discharge trough extends from the center of the silo to the exterior and a conveyor is employed to convey the cut silage to the exterior.

As the silo or other storage vessel has a substantial height, the siliage becomes extremely hard packed after an extended period of storage and the hard packed silage exerts a tremendous pressure on the rotating cutter arm. This pressure on the cutter arm, in some instances, prevents the cutter arm from rotating or seriously impairs the desired rotation of the arm. This is particularly true in situations where long fibrous materials, such as silage, are stored in the silo, for the long fibers become intertwined and there is no free flow of the material within the vessel.

The present invention is directed to an apparatus for cutting and dislodging fibrous material in a sealed storage structure and is specifically directed to an improved cutter tooth design. According to the invention, the endless cutter chain is provided with a series of thin, serrated teeth in combination with a series of large diamond-shaped head teeth. The serrated teeth serve to pierce and cut the fibrous material or silage and the diamond headed teeth rip through the cut silage and dislodge the same.

The arrangement of both the serrated and the diamond headed teeth on the conveyor chain is such that some of the teeth are disposed in a horizontal plane and extend outwardly from the cutter chain, while other teeth extend upwardly from the cutter chain and still other teeth extend upwardly and inwardly over the cutter arm. By this arrangement of teeth, the silage or other fibrous material is cut ahead of the rotating arm and also above the rotating cutter arm so as to decrease the pressure of the silage on the arm and prevent the resulting slow down of the arm due to excessive pressures.

The serrated teeth of the invention are provided with a generally sharp serrated leading edge which is cut at an angle to the direction of travel of the tooth. This angularly cut leading edge of the serrated tooth provides a slicing action which enables the sharp serrated edge to more readily slice through or cut the silage mass.

In addition, the serrations on the leading edge of the slicer teeth are slanted rearwardly away from the direction of travel so that the serrations or teeth will be self-cleaning and silage or other fibrous material will be automatically ejected from the serrations.

Other objects and advantages of the invention will appear in the course of the following description.

The drawings illustrate the best mode presently contemplated of carrying out the invention.

Figure 1:
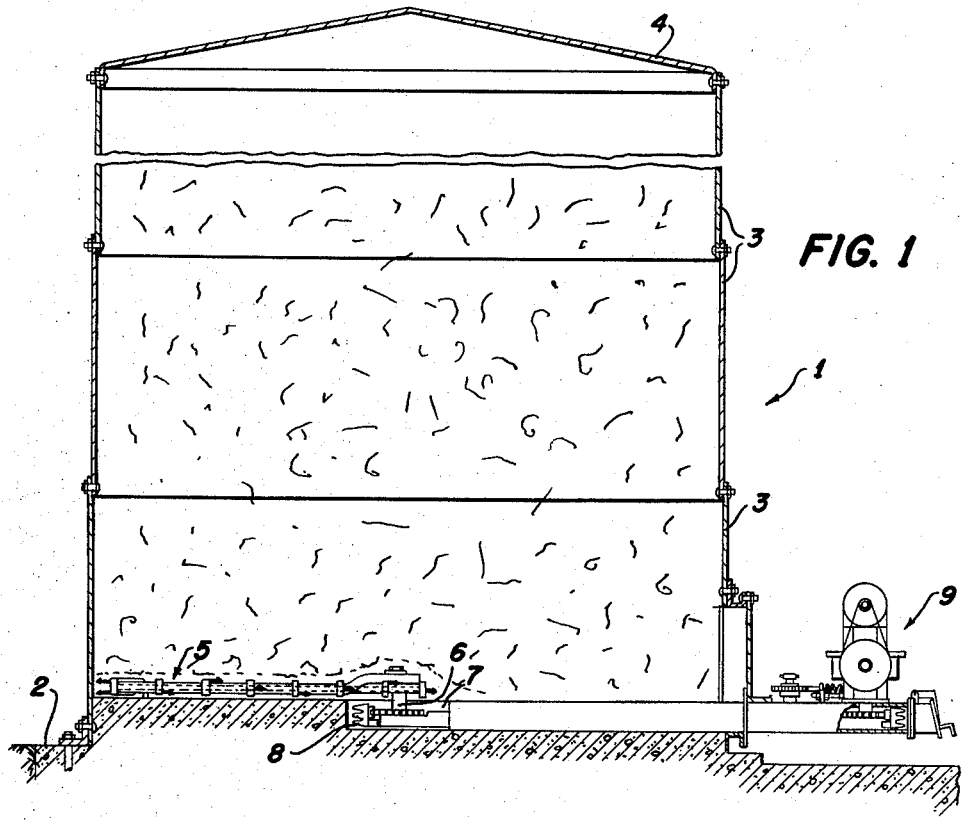
Figure 1 is a vertical section of a storage vessel incorporating the present invention.

The drawings illustrate a silo 1 or storage vessel supported on foundation 2 and adapted to contain a fibrous material, such as silage, haylage, wood chips or the like. The silo 1 is formed of a series of concentric cylindrical sections 3 which are joined together to form a cylindrical shell. The top of the shell is enclosed by a suitable roof 4.

To provide an air tight structure which is sealed to the atmosphere, the joints between the cylindrical sections are suitably sealed with a mastic or sealing compound.

To unload the fibrous material or silage from the silo 1, a rotating cutter arm 5 is rotatably mounted on a central drive post 6 which is located at the center of the silo and is supported on foundation 2. The cutter arm 5 is adapted to rotate within the silo 1 and undercut the silage and convey the same to the center of the silo where it is deposited in a trough 7 formed in foundation 2. The trough 7 extends radially outward to the exterior of the silo and a suitable conveyor 8 is disposed within the trough 7 and serves to convey the cut silage to the exterior. The drive post 6 and cutter arm 5 are rotated and conveyor 8 is driven by a suitable drive mechanism 9 which is located outside of the silo 1.

Figure 2:
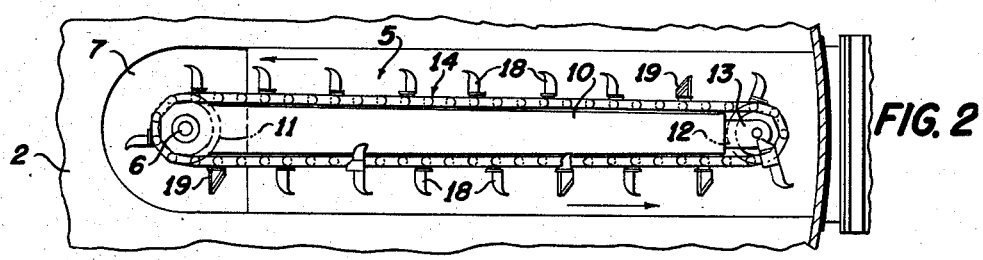
Fig. 2 is a plan view of the rotating cutter arm.

As best shown in Fig. 2, the cutter arm 5 includes an elongated frame 10 which carries a pair of sprockets 11 and 12. The drive sprocket 11 is secured to the central drive post 6 while the idler sprocket 12 is secured to the bifurcated outer end 13 of the frame. The sprockets 11 and 12 carry an endless roller chain 14 which is of a conventional type and consists of a plurality of pairs of offset links 15 which are connected at their extremities to adjacent pairs of links by rivets 16 to form the endless chain. The links of each pair are spaced apart by rollers 17 which are adapted to ride against the teeth of the sprockets 11 and 12.

The endless chain 14 is adapted to carry a plurality of hook teeth 18 and slicer teeth 19 which are connected to the chain through connecting bars 20. Every third pair of links 15 is formed with outwardly extending flanges 21 with the flange of the upper link of the pair facing upwardly and the flange of the lower link facing downwardly. The bars 20 are welded or bolted flatwise to the outer surface of the flanges 21 adjacent the leading end (in the direction of chain travel) of the links. The individual teeth 18 and 19 are welded endwise to the connecting bars 20.

The hook teeth 18 are similar in structure to the teeth shown in the patent to L. E. Broberg et al., 2,711,834 and entitled, "Cutter Teeth." Each individual tooth 18 is constructed with a large diamond-shaped head 22 which tapers into a generally thin body 23. The tooth 18 is curved in the direction in which it travels with chain 14 and the head 22 terminates in a sharply pointed tip. The sharp tip of the head 22 is adapted to penetrate into the silage and the lateral projections or ears of the enlarged diamond head serve to rip or tear the silage apart as the head passes therethrough.

Figure 8:
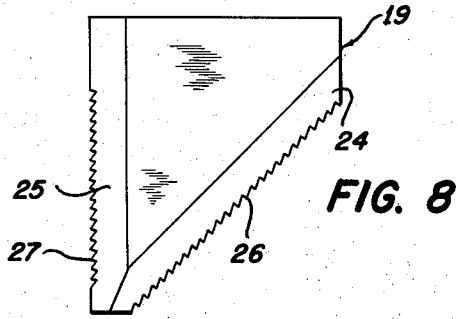
Fig. 8 is a top view of the slicer teeth shown in Fig. 6.
Figure 6:
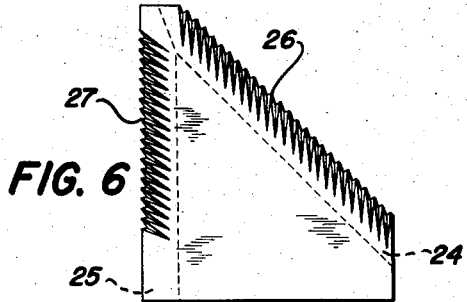
Fig. 6 is a bottom view of the slicer teeth showing the serrations.
Figures 7, 10:
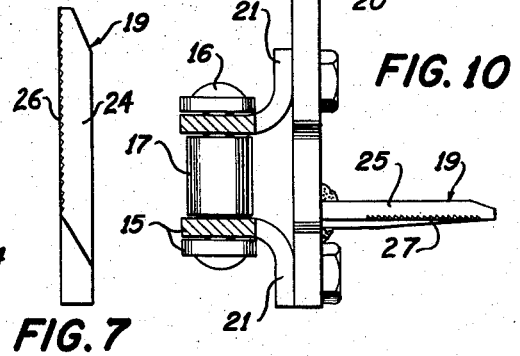
Fig. 7 is a side elevation of the slicer teeth shown in Fig. 6.
Fig. 10 is a view similar to Fig. 5 showing a modified arrangement of the teeth on the cutter chain.

The slicer teeth 19 are employed in combination with the hook teeth 18 and serve to slice or cut the fibrous material so that the material can be more readily dislodged by the large diamond headed hook teeth 18. The slicer teeth are best shown in Figs. 6 through 8 and each slicer tooth 19 has a forward or leading edge (in the direction of chain travel) which is cut angularly. The upper surface of each slicer tooth 19 is provided with beveled surfaces 24 and 25 which define cutting edges 26 and 27. To cut or slice through the fibrous material, the edges 26 and 27 are serrated to provide a series of teeth or serrations which extend substantially the length of both of the edges 26 and 27.

Figure 3:
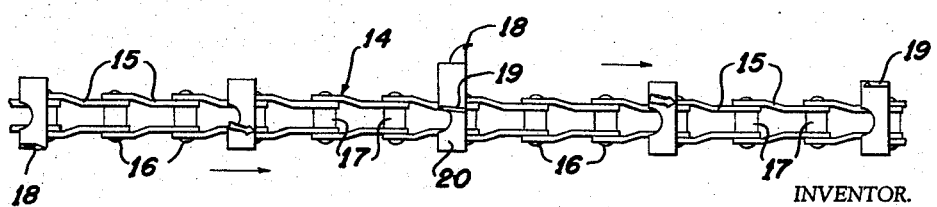
Fig. 3 is a fragmentary side elevation of the cutter chain showing the arrangement of both the hook and slicer teeth thereon.
Figure 5:
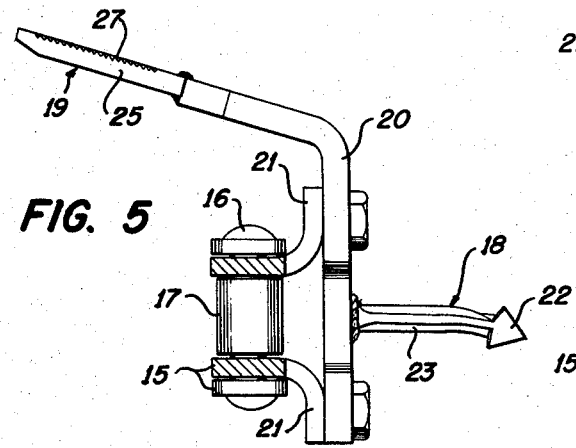
Fig. 5 is a transverse section of the structure shown in Fig. 4.
Figure 4:
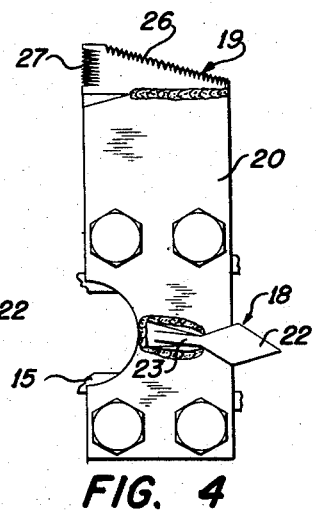
Fig. 4 is a side elevation with parts broken away showing the arrangement of the cutter teeth on a connecting bar.

As best shown in Figs. 3 and 11, the slicer teeth are disposed at an inclined downwardly angle on connector bars 20. This inclined position of the slicer teeth serves to hold the cutter chain down toward the foundation 2 and prevents the same from rising upwardly into the silage. In addition, the beveled surfaces 24 and 25, being on the upper surface of the slicer teeth, also serve to hold the slicer teeth and the cutter arm 5 down in the silage and prevent the same from rising during the cutting operation.

The angularly cut serrated edge 26 provides a slicing action of the tooth through the silage. As this edge is cut angularly to the direction of travel, the tooth is drawn through the silage and this results in a cutting or slicing action which is more effective in shredding the long fibrous material.

Figure 9:
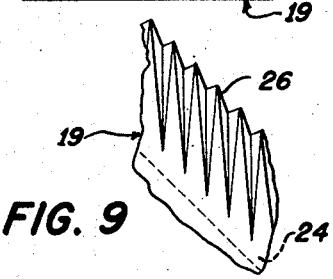
Fig. 9 is an enlarged fragmentary view of the slicer teeth shown in Fig. 6 and particularly showing the serrated edge.

As best shown in Figs. 6 and 9, the individual serrations on the edge 26 are slanted rearwardly away from the direction of travel of the tooth. The points of the individual serrations extend in a direction generally normal to the direction of travel of the tooth and this feature enables the serrations to be self-cleaning in that any silage which is lodged between the adjacent serrations will be automatically removed due to the angular positioning of the serrations.

The rear edge 27 of the slicer teeth extends generally normal to the direction of tooth travel, as shown in the drawings. However, it is conceivable that the edge 27 can be slanted forwardly in an opposite direction to edge 26 if the width of the tooth is sufficient. The serrations on edge 27 serve to slice through the silage when the cutter chain is operated in the opposite direction to that of the arrows in Figs. 2 and 3. If the reverse operation of the cutter chain is to be quite extensive, it may be desirable to employ a slanted edge for the tooth 27. Under normal operations, however, the reverse operation of the cutter chain is used only occasionally and therefore, the edge 27 is disposed generally normal to the direction of tooth travel.

As shown in the drawings, a number of the hook teeth 18 and slicer teeth 19 extend laterally outward from the connecting bars 20 in generally horizontal planes, while another portion of both the hook teeth 18 and slicer teeth 19 extend generally upwardly over the chain to remove the silage or fibrous material from above the chain. In addition, a third portion of both the hook teeth 18 and slicer teeth 19 extend upwardly and inwardly over the endless chain to remove the silage over the cutter arm. It has been found that the upwardly and inwardly extending teeth are critical to an efficient operation of the rotary cutter in order to loosen the silage mass above the cutter arm and facilitate the rotation thereof.

It has been found that no systematic arrangement of the slicer teeth and hook teeth on the chain is required. Generally speaking, the slicer teeth are located on a given connecting member at a specific horizontal plane and a hook tooth is then employed on the next succeeding connecting member at a slightly lower horizontal plane in order to rip out or dislodge the silage that was sliced by the slicer tooth on the preceding tooth. However, as the chain is endless, there is no definite tooth pattern involved other than there being a plurality of both hook and slicer teeth which extend laterally outward from the chain, upwardly over the chain and upwardly and inwardly over the cutter arm.

The present invention, which employs the combination of the slicer teeth and the enlarged hook teeth substantially increases the capacity of the bottom unloader. With the slicer teeth penetrating and slicing through the silage, the enlarged hook teeth can more readily remove and dislodge the silage with the result that the capacity of the unloader is greatly improved over a device which employs only the enlarged head hook teeth. In addition, the slicer teeth are disposed downwardly at a slight angle to the horizontal and are also provided with a beveled edge on the upper surface which tends to keep the cutter chain and cutter arm down in the silage and prevents the same from rising upwardly during operation.

The increased capacity without an increase in power means that the cutter arm will move more smoothly through the silage mass and oscillations or fluctuations of the cutter arm are eliminated which would impose a substantial stress on the center post and therefore increases the operating life of the unloading mechanism.

Various modes of carrying out the invention are contemplated as being within the scope of the following claims particularly pointing out and distinctly claiming the subject matter which is regarded as the invention.

I claim:

1. In an apparatus for cutting fibrous material, an endless member, means for driving the member in endless travel, a plurality of connecting members attached to the endless member at spaced locations thereon, and a plurality of slicer teeth secured to said connecting members and adapted to travel with said endless member and slice through said fibrous material, each of said slicer teeth having a generally sharp leading edge portion slanted away from the direction of tooth travel and having a plurality of serrations formed in said leading edge to shred said fibrous material as the tooth passes therethrough.

2. In an apparatus for cutting fibrous material, an endless chain, means for driving the chain in endless travel, a plurality of connecting members attached to the chain at spaced locations thereon, and a plurality of slicer teeth secured to said connecting members and adapted to travel with said chain and slice through said fibrous material, each of said slicer teeth having a thin body terminating in a sharp leading edge in the direction of chain travel and having a plurality of serrations formed in said leading edge to slice said fibrous material, and said slicer teeth being secured to said connecting members at a downwardly inclined angle to the horizontal in the direction of tooth travel to prevent the chain from rising in the fibrous material during operation.

3. In an unloading mechanism for use in a substantially air-tight storage structure adapted to contain a fibrous material, a cutter arm rotatably mounted within the structure and disposed to rotate within the lower end portion of the structure to undercut said fibrous material, an endless member carried by the cutter arm and mounted to travel in a fixed path on the cutter arm as the cutter arm is rotated, a plurality of slicer teeth secured at spaced locations on the endless member and disposed to penetrate and slice through the fibrous material during travel of the endless member, said slicer teeth having a thin body portion terminating in a sharp leading edge in the direction of tooth travel and having a plurality of serrations formed in said leading edge to slice said fibrous material, and a plurality of dislodging teeth secured in spaced locations on said endless member, said dislodging teeth having enlarged heads disposed to dislodge and convey the fibrous material after the same is sliced by said slicer teeth.

4. In an apparatus for cutting fibrous material, an endless chain, a plurality of connecting members attached to the chain at spaced locations thereon, a plurality of slicer teeth secured to said connecting members and adapted to travel with said chain and slice through said fibrous material, each of said slicer teeth having a generally sharp leading edge portion slanted away from the direction of tooth travel and having a plurality of serrations formed in said leading edge to shred said fibrous material as the tooth passes therethrough, and said slicer teeth being secured to said connecting members at a downwardly inclined angle to the horizontal in the direction of tooth travel to prevent the chain from rising in the fibrous material during operation.

5. In an unloader mechanism for use in a substantially air-tight storage structure adapted to contain a fibrous material, a cutter arm rotatably mounted within the structure and disposed to rotate within the lower end portion of the structure to undercut said fibrous material, an endless member carried by the cutter arm and mounted to travel in an endless path on the cutter arm as the cutter arm is rotated, a plurality of slicer teeth secured at spaced locations on the endless member and disposed to penetrate and slice through the fibrous material during travel of the endless member, each of said slicer teeth having a generally flat configuration and having a forward leading edge in the direction of tooth travel extending rearwardly at an acute angle to said direction of tooth travel, the upper surface of each of said slicer teeth adjacent said leading edge being beveled to provide said leading edge with a knife-like cutting edge and said leading edge having a series of serrations extending substantially the length thereof with the points of the individual serrations extending generally normal to the direction of tooth travel to prevent lodging of said fibrous material between said serrations.

6. In an apparatus for cutting fibrous material, an endless member, means for driving the member in endless travel, a plurality of connecting members attached to the endless member at spaced locations thereon, a plurality of slicer teeth secured to said connecting members and adapted to travel with said endless member and slice through said fibrous material, each of said slicer teeth having a generally sharp leading edge portion slanted away from the direction of tooth travel and having a plurality of serrations formed in said leading edge to shred said fibrous material as the tooth passes therethrough, and a plurality of dislodging teeth secured to said connecting members in spaced locations on said endless member, each of said dislodging teeth having a generally thin body in the direction of travel of said teeth and having an enlarged head portion provided with a pointed tip and laterally extending projections adapted to rip through and dislodge the fibrous material after the same is sliced by said slicer teeth.

7. In an unloading mechanism for use in a substantially air-tight storage structure adapted to contain a fibrous material, a cutter arm rotatably mounted within the structure and disposed to rotate within the lower end portion of the structure to undercut said fibrous material, an endless member carried by the cutter arm and mounted to travel in a fixed path on the cutter arm as the cutter arm is rotated, a plurality of slicer teeth secured at spaced locations on the endless member and disposed to penetrate and slice through the fibrous material during travel of the endless member, each of said slicer teeth having a thin body terminating in a sharp leading edge in the direction of chain travel and having a plurality of serrations formed in said leading edge to slice said fibrous material, and said slicer teeth being secured to said connecting members at a downwardly inclined angle to the horizontal in the direction of tooth travel to prevent the chain from rising in the fibrous material during operation, and a plurality of dislodging teeth secured in spaced locations on said endless member, said dislodging teeth having enlarged heads disposed to dislodge and convey the fibrous material after the same is sliced by said slicer teeth.

8. In a substantially air-tight storage structure adapted to contain a fibrous material, an unloading mechanism, comprising a cutter arm rotatably mounted within the structure, means for rotating the cutter arm within the lower end portion of the structure to undercut said fibrous material, an endless member carried by the cutter arm, means for driving said endless member in an endless path of travel as the cutter arm is rotated, a plurality of slicer teeth secured at spaced locations on the endless member and disposed to penetrate and slice through the fibrous material during travel of the endless member, said slicer teeth having a thin body portion terminating in a generally sharp leading edge in the direction of tooth travel and having a plurality of serrations formed in said leading edge to slice said fibrous material, and a plurality of dislodging teeth secured in spaced locations on said endless member, said dislodging teeth having enlarged heads disposed to dislodge and convey the fibrous material after the same is sliced by said slicer teeth, a number of said slicer teeth and said dislodging teeth extending laterally outwardly from said endless member in a series of generally horizontal planes and a second number of said slicer teeth and dislodging teeth extending upwardly and laterally inwardly over the endless member to remove the fibrous material in the area over the endless member.

9. In an apparatus for cutting fibrous material, an endless chain, a slicer tooth secured to the chain and extending laterally outward from the chain in a generally horizontal plane, said slicer tooth having a generally sharp leading edge portion slanted away from the direction of tooth travel and having a plurality of serrations formed in said leading edge to shred said fibrous material as the tooth passes therethrough, and a dislodging tooth secured to a portion of the chain following the location of attachment of said slicer tooth to said chain in the direction of chain travel and extending laterally outward from said chain in a generally horizontal plane beneath said first named horizontal plane, said dislodging tooth having an enlarged head to dislodge and convey the fibrous material after the same is sliced by said slicer teeth.

10. In an unloader mechanism for use in a substantially air tight storage structure adapted to contain a fibrous material, a cutter arm rotatably mounted within the structure and disposed to rotate within the lower end portion of the structure to undercut said fibrous material, an endless member carried by the cutter arm and mounted to travel in an endless path on the cutter arm as the cutter arm is rotated, a plurality of slicer teeth secured at spaced locations on the endless member and disposed to penetrate and slice through the fibrous material during travel of the endless member, each of said slicer teeth having a forward leading edge in the direction of tooth travel extending rearwardly at an acute angle to said direction of tooth travel and said leading edge having a series of serrations extending substantially the length thereof with the points of the individual serrations extending generally normal to the direction of tooth travel to prevent lodging of said fibrous material between said serrations, and a plurality of dislodging teeth secured in spaced locations on said endless member, said dislodging teeth having enlarged heads disposed to dislodge and convey the fibrous material as the same is sliced by said slicer teeth.

References Cited in the file of this patent

UNITED STATES PATENTS

| | | |
|---|---|---|
| 226,774 | Nunan | Apr. 20, 1880 |
| 1,388,547 | Burns | Aug. 23, 1921 |
| 1,435,514 | Burns | Nov. 14, 1922 |
| 2,635,770 | Tiedemann | Apr. 21, 1953 |
| 2,711,834 | Broberg | June 28, 1955 |